United States Patent
Mahasenan et al.

(10) Patent No.: US 12,425,819 B2
(45) Date of Patent: Sep. 23, 2025

(54) METHOD OF VIRTUALIZING A SECURITY PANEL, FIRE PANEL, AND ACCESS PANEL USING PRIVATE 5G NETWORK SLICES

(71) Applicant: Honeywell International Inc., Charlotte, NC (US)

(72) Inventors: Arun Vijayakumari Mahasenan, Hopkins, MN (US); Amit Kulkarni, Plymouth, MN (US); Jesse J. Otis, North Haven, CT (US); Ulf Duerr, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 406 days.

(21) Appl. No.: 17/554,716

(22) Filed: Dec. 17, 2021

(65) Prior Publication Data
US 2023/0199443 A1    Jun. 22, 2023

(51) Int. Cl.
| | | |
|---|---|---|
| *H04W 4/33* | (2018.01) | |
| *G05B 15/02* | (2006.01) | |
| *H04W 48/18* | (2009.01) | |
| *H04W 72/0446* | (2023.01) | |
| *H04W 84/18* | (2009.01) | |

(52) U.S. Cl.
CPC ............. *H04W 4/33* (2018.02); *G05B 15/02* (2013.01); *H04W 48/18* (2013.01); *H04W 72/0446* (2013.01); *H04W 84/18* (2013.01)

(58) Field of Classification Search
CPC ... H04W 4/33; H04W 48/18; H04W 72/0446; H04W 84/18; H04W 16/18; H04W 16/10; H04W 84/12; H04L 41/5019; H04L 43/0852; H04L 43/16; H04L 41/40; H04L 41/08; H04L 43/08; G05B 15/02
See application file for complete search history.

(56) References Cited

U.S. PATENT DOCUMENTS

| | | | |
|---|---|---|---|
| 9,893,935 B2 | 2/2018 | Christianson et al. | |
| 10,380,863 B2 | 8/2019 | Wedig et al. | |
| 10,785,652 B1 | 9/2020 | Ravindranath et al. | |
| 11,212,660 B2 * | 12/2021 | Taft | H04W 8/26 |

(Continued)

FOREIGN PATENT DOCUMENTS

| | | |
|---|---|---|
| CN | 109272615 A | 1/2019 |
| CN | 110327572 A | 10/2019 |
| CN | 110912995 A | 3/2020 |

*Primary Examiner* — Yu-Wen Chang
(74) *Attorney, Agent, or Firm* — Brooks, Cameron & Huebsch, PLLC

(57) ABSTRACT

Devices, methods, and systems for virtualizing a security panel, fire panel, and/or access panel using 5G network slices are described herein. One on-premise virtualized building control panel system device, includes a processor, memory, having instructions stored therein that are executable by the processor to provide a fifth generation (5G) network core to a building in which the device is located, establish a first network slice that defines a first subnetwork slice, the first subnetwork slice having a defined bandwidth and only communicating data and instructions relating to building control functions, and communication connections to communicate instructions and data between the control panel system device and 5G base stations and building sensing devices within the building.

20 Claims, 1 Drawing Sheet

(56) References Cited

U.S. PATENT DOCUMENTS

| | | | |
|---|---|---|---|
| 11,871,284 B1* | 1/2024 | Edara | H04W 16/14 |
| 2013/0109406 A1* | 5/2013 | Meador | H04W 4/33 |
| | | | 455/456.1 |
| 2022/0191112 A1* | 6/2022 | Gupta | H04L 67/10 |
| 2022/0248311 A1* | 8/2022 | Kwok | H04W 28/16 |
| 2022/0319302 A1* | 10/2022 | Macy | G08B 25/003 |
| 2023/0084355 A1* | 3/2023 | Junkins | H04M 15/00 |
| | | | 370/329 |
| 2023/0180017 A1* | 6/2023 | Gadalin | H04W 16/22 |
| | | | 370/328 |

* cited by examiner

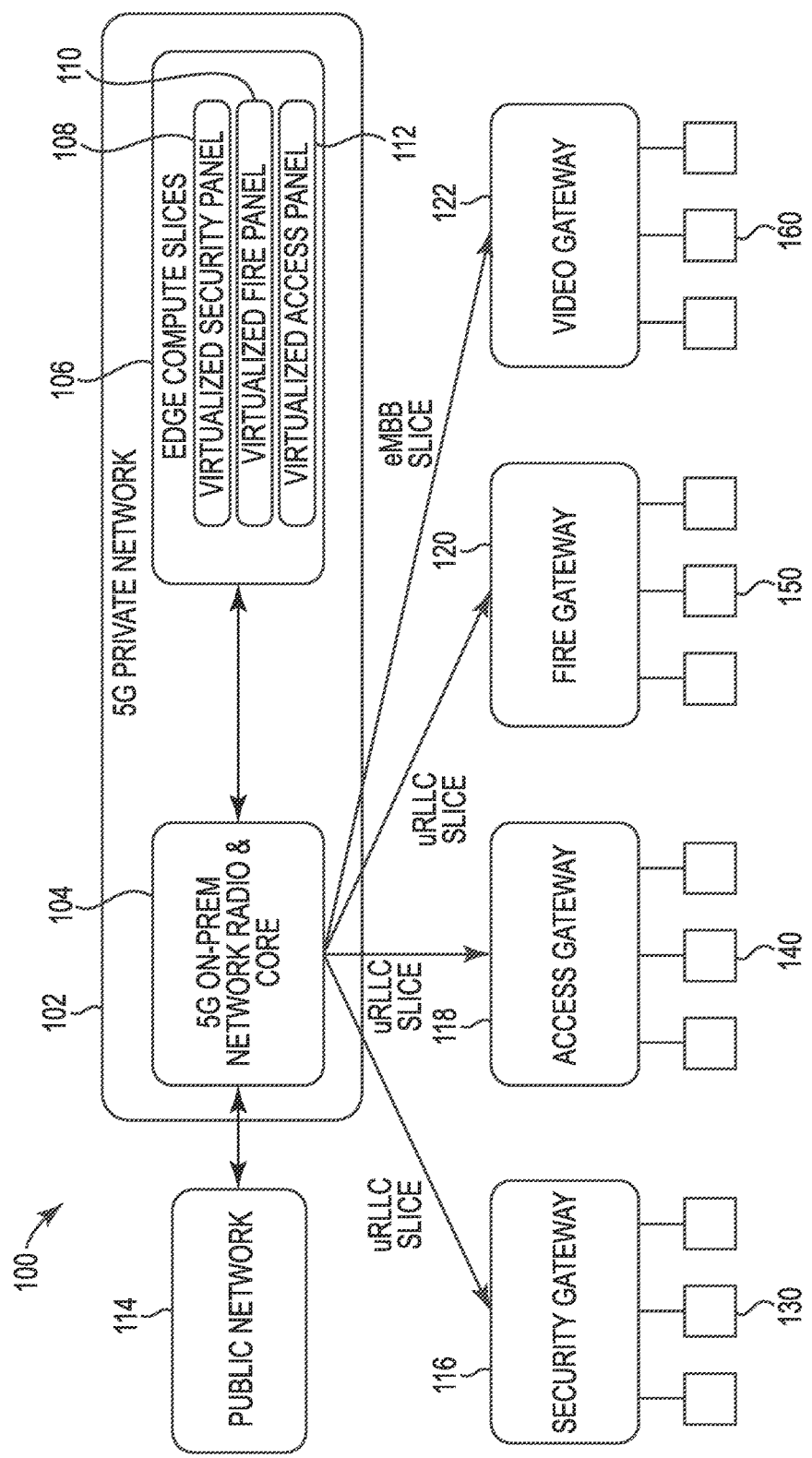

METHOD OF VIRTUALIZING A SECURITY PANEL, FIRE PANEL, AND ACCESS PANEL USING PRIVATE 5G NETWORK SLICES

TECHNICAL FIELD

The present disclosure relates generally to methods, systems, and devices for virtualizing a security panel, fire panel, and/or access panel using 5G network slices.

BACKGROUND

Currently available fire panels, security panels, and access panels (building control panels) are purely hardware based, and sometimes include a cloud-connector, connecting the panel to a network, such as the Internet for less critical functions. This control panel system structure is generally required due to the latency and reliability requirements of such systems and the need for the ability to take action quickly.

Additionally, if the system includes a network connection to the control panel environment, the connection is typically isolated from other networks in the building. This is done to keep the available bandwidth of the control panel system consistent and avoid other network traffic from reducing the available bandwidth to below a threshold for effective communication for the building control panel functions.

Another reason this is done is to ensure that alarm and other messages from the fire system are reliably delivered through the network and within guaranteed time bounds without having to contend with other non-fire safety traffic.

This hardware-centric panel architecture will also not allow the sensor network to scale for control and analytics. This limits the ability of such panels to be able to provide the expanded features discussed herein with respect to the embodiments of the present disclosure.

BRIEF DESCRIPTION OF THE DRAWINGS

FIG. 1 is an illustration of a 5G building control system environment according to an embodiment of the present disclosure.

DETAILED DESCRIPTION

In-building 5G network deployments, as discussed and utilized in the embodiments of the present disclosure herein, will create a building control system environment that allows the system to have a 5G network core deployed on premise at the building. This implementation offers the capability to use the 5G network as a backbone for a highly reliable and low latency local area network.

This is because the local traffic does not need to be routed to a remote network core and allows for virtualization of many of the control panel functions that would have been traditionally handled by one or more physical control panels. For example, if a 4G network were connected to a physical control panel, the core network management functionalities and control panel actuation functions of the 4G system are located outside of the building and all communication with the network core that provides those functions passes through cell towers located outside the building.

Such a system creates security issues, as third parties do not need to be inside the building to access the network or to intercept data. They also create latency issues, as the signals to and from the control panel need to pass through cell towers which may not be near the building. This added distance necessarily slows communication, causing latency in the flow of data and instructions within the building control system, which can be problematic in some instances.

Through the implementation of the 5G network embodiments described in the present disclosure, the core network functions can be moved inside the building and can be expanded to give the network control over more critical building control system functions. This also improves security and latency.

It can be accomplished, for example, by the installation of base stations that form small cells within the building. This small cell 5G-based system creates a private, low latency, high reliability network that can be used within the building to execute building control functions.

5G-based control panel system embodiment architectures also enable network slicing that provides quality of service to applications by reserving communication resources and computing resources. Network slicing allows the 5G network to be split up into multiple subnetworks, so, for example, each software application needing a network for its operation can be allocated its own resources.

For example, a first network slice can be established that defines a first subnetwork slice, the first subnetwork slice has a defined bandwidth and can be configured to only communicate data and instructions relating to building control functions. Or, in some embodiments, access, security, and fire alarm functionalities can each have their own network slices. In this manner, the building control network or portions thereof can have its own resources allocated to it and, thereby, each network slice can be a high reliability network, among other benefits.

For instance, in some embodiments, separate virtual subnetworks can be established for a fire alarm system, a security system, and a building access system within the building. This can establish independent low latency, high reliability networks for each system.

As used herein, low latency can be less than twenty milliseconds and, in some embodiments, less than ten milliseconds. High latency is any latency above the low latency threshold. For instance, if the low latency threshold is ten milliseconds, then high latency is any latency above ten milliseconds or if the low latency threshold is twenty milliseconds, then high latency is any latency above twenty milliseconds.

In some such implementations, the 5G network can have other virtual subnetworks established that handle other building functions or functions of tenants of the building. Examples of such functions can include: HVAC control/monitoring applications, Internet access, access to work-based applications (e.g., word processing, spreadsheet, publication applications), access to document management applications, access to inventory management applications, access to point of sale applications, or access to other suitable building or tenant applications. In this manner, the control panel subnetworks can be separated from the building and tenant functions, thereby providing better latency and reliability, among other benefits.

In some jurisdictions, a governmental entity may require certain minimum thresholds regarding the latency, bandwidth, and/or reliability of the operation of such control panel systems. Traditional systems could only meet these requirements through use of physical control panels that handled the control panel functions.

However, through use of splitting via a 5G-based network architecture (creating slices), it may be possible to meet government required thresholds regarding latency, bandwidth, and reliability due to the dedicated nature of the bandwidth assignment to the building control network and its independence from other building or tenant network traffic. For example, with new spectrum options like Citizens Broadband Radio Service (CBRS) or lease licensed spectrum from carriers, building owners can deploy their own private 5G networks in licensed bands.

Another benefit of using a 5G-based networking strategy as discussed in the present disclosure is that the network is private and can be administered, for example, through use of an edge computing device in the building. Private 5G networks can use private spectrum like CBRS band or lease licensed spectrum from carriers, thereby limiting the possible network traffic through the building-based network.

Embodiments of the present disclosure can also virtualize fire panels, security panels, and access control panels as software applications in network slices utilizing functionalities made possible through use of 5G in such systems, rather than physical hardware panels. This allows the functionality of the panel to more readily be updated as new hardware does not need to be installed and allows for mobile access to panel functions. Such mobility may also be beneficial for technicians that are servicing network devices at locations away from the panel as the technician can interact with panel functionalities without being next to the panel location, among other benefits.

Through 5G-based system architecture deployment in buildings, computing and communication platform convergence can occur within the buildings. The converged platform embodiments of the present disclosure open new architectures for access control (controls who exits/enters the building through access points), fire (fire and smoke sensing and alarming, etc.), and security system (unauthorized access, window breakage sensing, etc.) in buildings. The embodiments of the present disclosure discuss how the existing panel functionality can be executed via software, rather than hardware, using, for example, software on a 5G edge device within the building. The new architecture enables more edge computing and communication capability for panels with additional capability to add recurring software revenue.

Another often used government requirement is the ability to provide a redundant network, as a third party may jam the network paths making the network inoperable without a redundant network path being available. This typically requires a separate physical network path and hardware to accommodate the redundant path.

Due to the discussed latency, bandwidth, and reliability capabilities network slicing can allow for such redundancy to be virtually constructed. This can be provided as a redundant network to the physical pathway or two virtual subnetworks could provide redundancy to each other. For example, two virtual subnetwork slices could be configured having different frequencies.

For example, a network could have three virtually created subnetworks: two network slices being configured to handle controller communication, which would be high bandwidth, high reliability, low latency communications within the system. These would be redundant networks thereby satisfying a government redundancy requirement.

The third network slice could be used for sensor communication between sensors connected to the building control system and the system controller (e.g., building control panel). For such a purpose, the network slice could be a low bandwidth, low latency network. Further, in some implementations, a redundant subnetwork to this subnetwork could also be virtually created. As can be understood from this example, the embodiments of the present disclosure also allow the system to provide multiple, different qualities of service simultaneously with one set of hardware.

As used in this example, controller communication can include, for instance, control communications between the controller and the one or more network sensors (e.g., smoke detector, pull station, horn, strobe, for a fire system). Another network slice could provide communications between controllers, such as between a fire system controller and a security system controller or between multiple controllers of the same type (e.g., two access system controllers). These could be physical components such as control panels or could be virtualized components, or a combination of these.

Examples of controller communication and functions include: event processing, such as data analysis to determine if there is a fire/security/access event and sequencing of cause and effect (e.g., what to do if an event occurs and when). In some implementations the controllers need to be in reliable communication with each other to coordinate their various functions. These control functions may be decentralized in different areas of the building (e.g., fire sensor sensing an event in area A and dealing with functions of the system having to do with that event, and fire monitoring in other areas that do not have an event).

Another benefit of embodiments of the present disclosure is that due to the bandwidth availability of a 5G network, a heartbeat system can be utilized wherein each controller (on-premise virtualized building control panel system device) periodically (e.g., every second) sends a signal to each other building sensing component to solicit a response indicating that the sensor is operational and communicating. If a new component sends a message to the controller, the controller asks for status information (e.g., solicit off-normal conditions, such as: are any alarm conditions present, is the device have any trouble communicating or in operation, is any functionality disabled, is any functionality active). This allows the controller to get in sync with the component. Controllers can also communicate in such a manner to be in sync with each other. This can minimize network downtime as problems with controllers and/or their components can be identified quickly.

The system can also include a functionality to measure the quality of service (e.g., bandwidth, latency, reliability are factors that can be used to measure quality of service), such as, based upon network traffic monitoring. For example, a threshold can be set to indicate that the network throughput cannot achieve the quality of service desired. This is to ensure that the system has the bandwidth capabilities to provide the reliability, latency, and functionality desired during a high bandwidth event, such as a fire emergency. For example, if a fire event happens in a building and many of the occupants begin using their phones to communicate with loved ones, the system needs to have the allocated bandwidth to still allow reliable, low latency communications between components.

Embodiments of the present disclosure can also be utilized with respect to public address or voice alarm components or alarm systems having such components. These systems can have controllers communicating with each other and communication between a controller and a number of end points (e.g., streaming audio signals to an IP addressable speaker).

These communications could also be their own network slice, in some implementations. For instance, in one such implementation, the system can have one or multiple redundant communications slices (one, if another mode of communication is used for redundancy, such as twisted pair or Ethernet) for high bandwidth communication and a separate slice for communication with the IP speakers.

In such implementations, jitter can be a measure of quality of service. Jitter is a noise component of an audio signal that can reduce the sound clarity of the audio message and, as such, jitter can be monitored to ensure that the level of jitter is not above a threshold quantity. If the threshold is exceeded, the controller can issue an alarm condition notifying a system user that jitter should be addressed on the network (e.g., network slice for the audio functionality).

In some embodiments, the system can also measure signal strength as a function of quality of service. In some such embodiments, the system can, for example, have a monitor that can provide an early warning (e.g., signal strength has exceeded a preliminary early warning threshold) of a drop in signal strength. For example, the system can have a local trouble indicator that indicates that signal strength has exceeded a threshold for quality of service and needs to be addressed. This may be a helpful functionality as part of a routine site survey process to aid technicians in finding network issues before signal strength becomes an issue effecting network performance.

Another benefit of embodiments provided by the present disclosure is that network slicing in 5G enables selectability of ultra-reliable low latency control (uRLLC) and enhanced mobile broadband (eMBB) communication types based on application requirements, among other communication types. uRLL can, for example be used for control panel system operation communications. eMBB can provide greater data-bandwidth complemented by moderate latency improvements which can be useful, for example, in transmission of audio or video data, which may be utilized in such systems to see occupants of building areas, situational status conditions, or other information. In some embodiments, the system can select (manually, through human operator input, or automatically, through computing device executable instructions) the communication type based on the type of usage the network slice will have or what the requirement, such as for quality of service will be.

Another benefit to having a 5G-based control panel system enabled in a building is that it enables the ability to implement one or more network slices that can provide wireless LAN communication over 5G within the building itself. This allows devices within the building to communicate without passing information to far away cell towers and keeps data within the building, which is a security benefit, among other benefits.

Additionally, in some embodiments, the existing functionality of a control panel can be split, for example, between a gateway device and a 5G edge device. For instance, the gateway device can act as a communication hub for communication between the low power sensors and the 5G private network and the 5G edge device can act as a computing and storage platform. This allows the 5G device to have even more improved latency and reliability.

Current fire panels, security panels, and access panels are purely hardware based and can, for example, include a cloud-connector for less critical functions.

This hardware centric panel architecture will not allow the sensor network to scale for control and analytics. With 5G private networks on-premise, the network core can reside at the network edge and will allow for network-slicing capability, which enables the core functions of the panel to reside on the network edge within the building.

Devices, methods, and systems for virtualizing a security panel, fire panel, and/or access panel using 5G network slices are described herein. One on-premise virtualized building control panel system device, includes a processor, memory, having instructions stored therein that are executable by the processor to provide a fifth generation (5G) network core to a building in which the device is located, establish a first network slice that defines a first subnetwork slice, the first subnetwork slice having a defined bandwidth and only communicating data and instructions relating to building control functions, and communication connections to communicate instructions and data between the control panel system device and building sensing devices within the building.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing FIGURE number and the remaining digits identify an element or component in the drawing.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an illustration of a 5G building control system environment according to an embodiment of the present disclosure. FIG. 1 provides a network system 100 that has multiple parts including a public network portion 114 and a private network portion 102.

The private network portion 102 is located on-premise at the building and has a core operating system that carries out the functions of communicating to the various components (e.g., system devices such as fire sensors in a fire alarm system) connected to the private network as well as to the public network 114 which is off-premise. The core operating system 104 also manages a number of virtualized control panels that are used to communicate information to and from a system user. For example, in the embodiments shown, a central virtual control panel 106 having a virtualized security panel 108, a virtualized fire panel 110, and a virtualized access panel 112.

As used herein, a virtualized control panel is a user interface that includes a mechanism to allow a user to input commands to a building control system (e.g., fire system) to control physical components thereof and includes a mechanism to convey information to the user. Examples include computing device having a keyboard and/or mouse and/or a display or a touch screen, such as on a tablet, desktop, laptop, or mobile device.

The core operating system 104 also communicates with a number of physical components of the various systems (e.g., security system components, access system components, fire system components, video components). These components can be accessed via gateways (communication connections) to the computing device running the core operating system 116, 118, 120, and 122. For example, communication connections can be used to communicate instructions and data between the control panel system device and building sensing devices within the building.

In some embodiments, as shown in FIG. 1, each gateway communicates to component devices (building security system devices 130, building access system devices 140, building fire system devices 150, building video system devices 160) of a different network slice (e.g., communication for the security network slice via gateway 116 to building security system devices 130), but in some embodiments, gateways can communicate to multiple network slices. For example, the fire gateway 120 could communicate to a number of sensor devices on one slice and/or a number of fire system controllers on another slice if it was desired for those types of communications to have different bandwidth, latency, or reliability characteristics.

The device running the core operating system is a computing device having a processor for executing instructions and memory having executable instructions and data stored therein. The memory can be any type of storage medium that can be accessed by the processor to perform various examples of the present disclosure. For example, the memory can be a non-transitory computer readable medium having computer readable instructions (e.g., executable instructions/computer program instructions) stored thereon that are executable by the processor in accordance with the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory can be located within the computing device, embodiments of the present disclosure are not so limited. For example, memory can also be located internal to another computing resource (e.g., enabling computer readable instructions to be downloaded over the Internet or another wired or wireless connection).

A computing device can also include a user interface. A user (e.g., operator) of computing device can interact with the computing device via the user interface. For example, the user interface can provide (e.g., display and/or present) information to the user of the computing device, and/or receive information from (e.g., input by) the user of computing device. For instance, in some embodiments, user interface can be a graphical user interface (GUI) that can provide and/or receive information to and/or from the user of the computing device. The display can be, for instance, a touch-screen (e.g., the GUI can include touch-screen capabilities). Alternatively, a display can include a television, computer monitor, mobile device screen, other type of display device, or any combination thereof, connected to mobile device and configured to receive a video signal output from the mobile device.

As an additional example, user interface can include a keyboard and/or mouse the user can use to input information into the computing device. Embodiments of the present disclosure, however, are not limited to a particular type(s) of user interface.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An on-premise virtualized building control panel device, comprising:
   a processor;
   memory, having instructions stored therein that are executable by the processor to:
   control a private fifth generation (5G) network operating within a building in which the on-premise virtualized building control panel for a security, access, or fire system device is located;
   establish a first network slice that defines a first subnetwork slice, the first subnetwork slice having a defined bandwidth and only communicating data and instructions relating to at least one of building security, access, or fire system control functions within the private 5G network;
   establish a second network slice that defines a second subnetwork slice, the second subnetwork slice having a defined bandwidth that is lower than the defined bandwidth of the first subnetwork slice; and
   communication connections to communicate at least one of security, access, or fire system instructions and data between the on-premise virtualized building control panel device and at least one of security, access, or fire system building sensing devices within the building.

2. The on-premise virtualized building control panel device of claim 1, wherein the first subnetwork slice provides latency of less than or equal to ten milliseconds.

3. The on-premise virtualized building control panel device of claim 1, wherein the first subnetwork slice provides latency of less than or equal to twenty milliseconds.

4. The on-premise virtualized building control panel device of claim 1, wherein the first subnetwork slice only communicates data and instructions relating to building access functions.

5. The on-premise virtualized building control panel device of claim 1, wherein the first subnetwork slice only communicates data and instructions relating to building fire alarm functions.

6. The on-premise virtualized building control panel device of claim 1, wherein the first subnetwork slice only communicates data and instructions relating to building security functions.

7. The on-premise virtualized building control panel device of claim 1, wherein the second subnetwork slice communicates data and instructions relating to one or more other building or tenant functions.

8. An on-premise virtualized building control panel system, comprising:
one or more on-premise security, access, or fire system building sensing devices; and
an on-premise virtualized building security, access, or fire control panel system device, including;
a processor;
memory, having instructions stored therein that are executable by the processor to:
control a private fifth generation (5G) network operating within a building in which the on-premise virtualized building control panel for a security, access, or fire system device is located;
establish a first network slice that defines a first subnetwork slice, the first subnetwork slice having a defined bandwidth and only communicating data and instructions relating to at least one of building security, access, or fire system control functions within the private 5G network;
establish a second network slice that defines a second subnetwork slice, the second subnetwork slice having a defined bandwidth that is lower than the defined bandwidth of the first subnetwork slice; and
communication connections to communicate at least one of security, access, or fire system instructions and data between the on-premise virtualized building control panel system device and at least one of security, access, or fire system building sensing devices within the building.

9. The on-premise virtualized building control panel system of claim 8, wherein the first subnetwork slice only communicates data and instructions relating to one of: building access functions, building fire alarm functions, or building security functions.

10. The on-premise virtualized building control panel system of claim 9, wherein the second subnetwork slice only communicates data and instructions relating to one of: building access functions, building fire alarm functions, or building security functions and not communicated via the first subnetwork slice.

11. The on-premise virtualized building control panel system of claim 10, wherein the instructions stored therein that are executable by the processor to establish a third network slice that defines a third subnetwork slice, the third subnetwork slice having a defined bandwidth and only communicating data and instructions relating to one of: building access functions, building fire alarm functions, or building security functions and not communicated via the first or second subnetwork slices.

12. The on-premise virtualized building control panel system of claim 9, wherein the second subnetwork slice communicates data and instructions relating to one or more of: HVAC control/monitoring applications, Internet access, access to work-based applications, access to document management applications, access to inventory management applications, and access to point of sale applications.

13. The on-premise virtualized building control panel system of claim 11, wherein the second subnetwork slice communicates data and instructions relating to one of: HVAC control/monitoring applications, Internet access, access to work-based applications, access to document management applications, access to inventory management applications, and access to point of sale applications.

14. The on-premise virtualized building control panel system of claim 8, wherein the second subnetwork slice communicates data and instructions not relating to building control functions.

15. The on-premise virtualized building control panel system of claim 8, wherein the first subnetwork slice has a latency below twenty milliseconds.

16. The on-premise virtualized building control panel system of claim 8, wherein the first subnetwork slice has a latency less than or equal to twenty milliseconds and the second subnetwork slice has a latency above twenty milliseconds.

17. An on-premise virtualized building control panel system, comprising:
one or more on-premise security, access, or fire system building sensing devices; and
an on-premise virtualized building security, access, or fire control panel system device, including;
a processor;
memory, having instructions stored therein that are executable by the processor to:
control a private fifth generation (5G) network operating within a building in which the on-premise virtualized building control panel for a security, access, or fire system device is located;
establish a first network slice that defines a first subnetwork slice, the first subnetwork slice having a defined bandwidth and only communicating data and instructions relating to at least one of building security, access, or fire system control functions within the private 5G network;
establish a second network slice that defines a second subnetwork slice, the second subnetwork slice having a defined bandwidth that is lower than the defined bandwidth of the first subnetwork slice; and
communication connections to communicate at least one of security, access, or fire system instructions and data between the on-premise virtualized building control panel system device and at least one of security, access, or fire system building sensing devices within the building.

18. The on-premise virtualized building control panel system of claim 17, wherein the on-premise virtualized building control panel system device is communicatively connected to a physical building control panel.

19. The on-premise virtualized building control panel system of claim 17, wherein, when creating a network slice, the on-premise virtualized building control panel system device includes instructions to configure at least one of a: bandwidth of the network slice, reliability of the network slice, or latency of the network slice.

20. The on-premise virtualized building control panel system of claim 17, wherein the on-premise virtualized building control panel system device includes instructions to send a signal to at least one of the building sensing devices.

* * * * *